No. 871,419. PATENTED NOV. 19, 1907.
G. J. KNOLL.
CONVERTIBLE STREET CAR.
APPLICATION FILED OCT. 23, 1905.
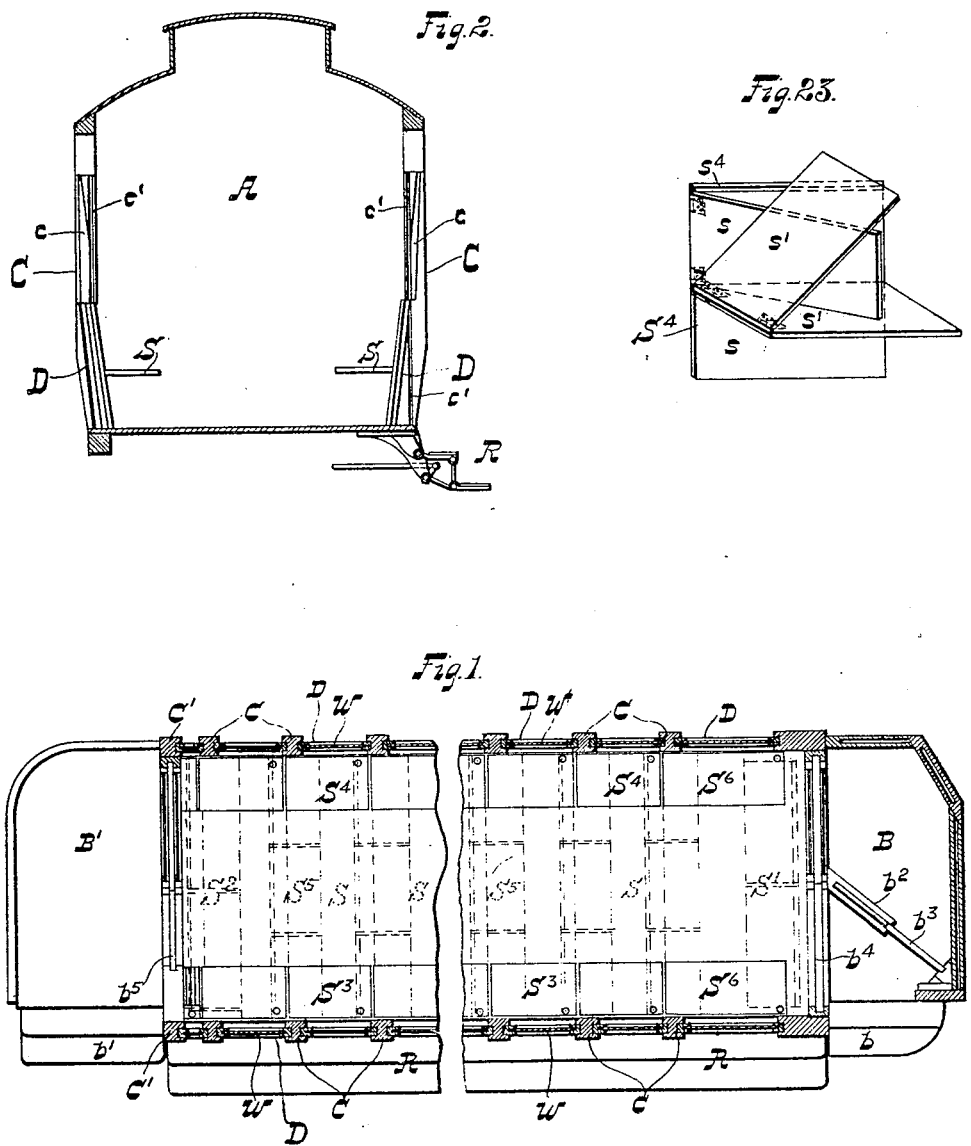

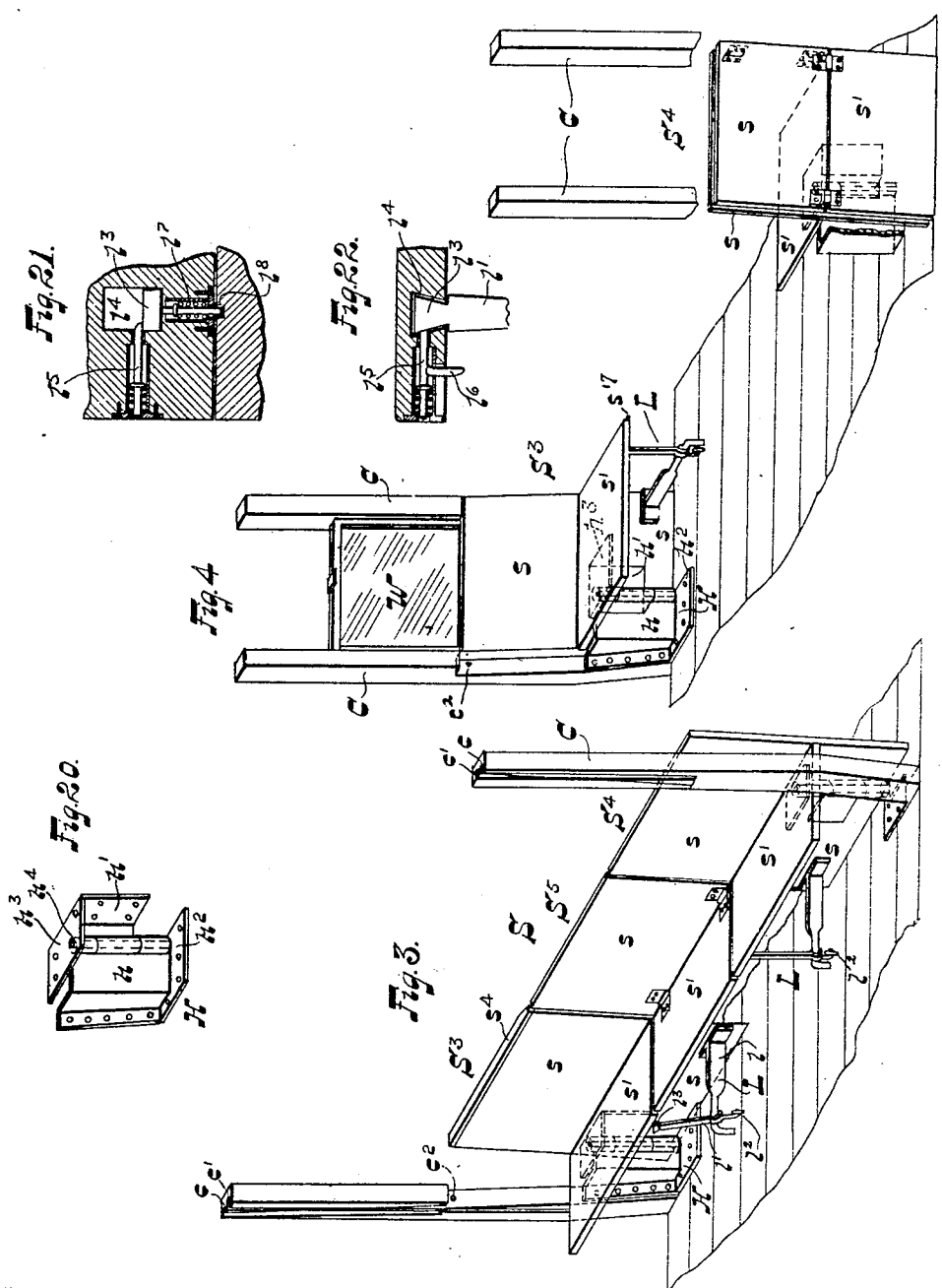

No. 871,419. PATENTED NOV. 19, 1907.
G. J. KNOLL.
CONVERTIBLE STREET CAR.
APPLICATION FILED OCT. 23, 1905.
5 SHEETS—SHEET 3.
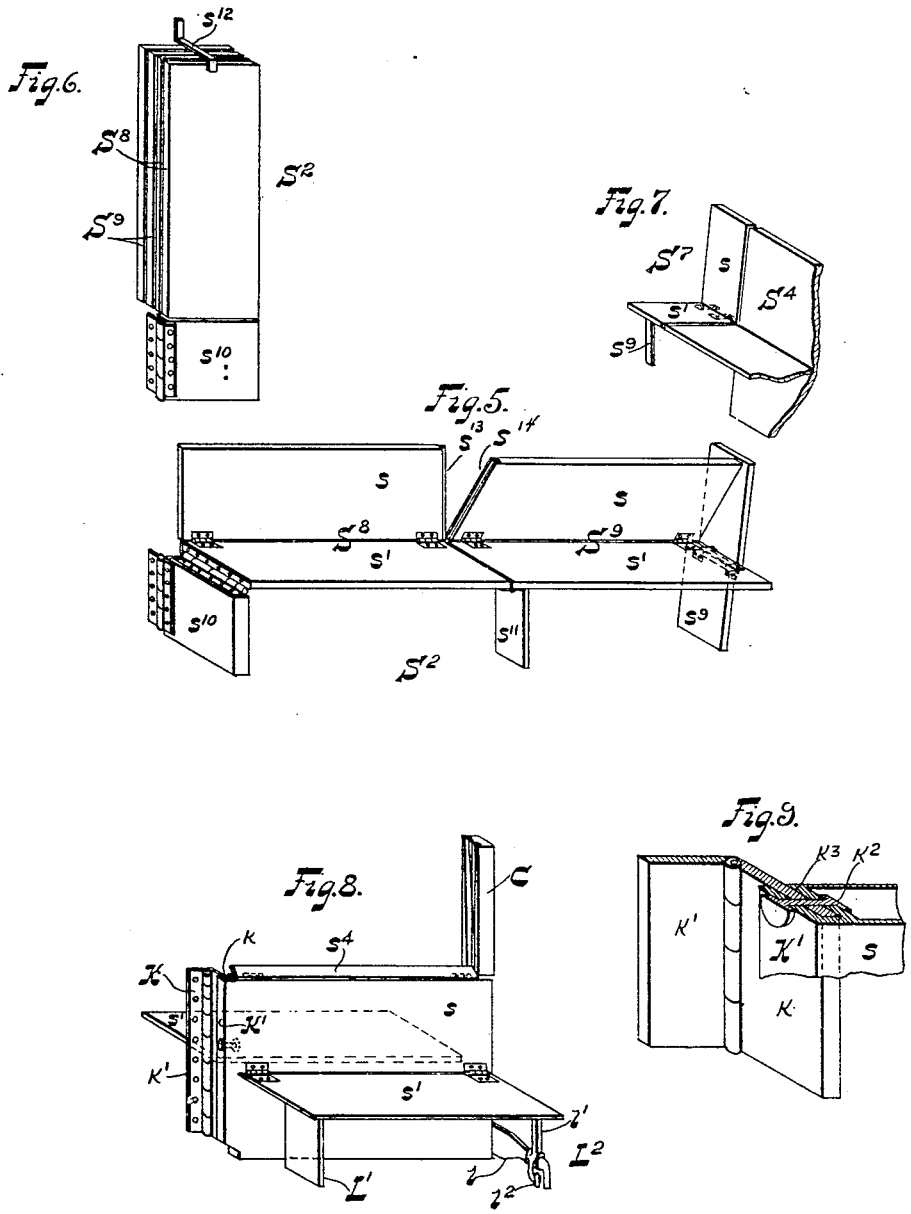

No. 871,419. PATENTED NOV. 19, 1907.
G. J. KNOLL.
CONVERTIBLE STREET CAR.
APPLICATION FILED OCT. 23, 1905.
5 SHEETS—SHEET 4.
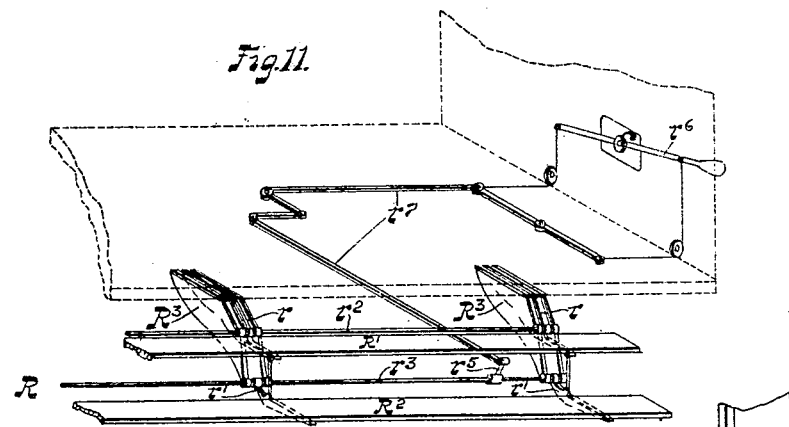
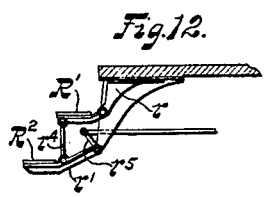
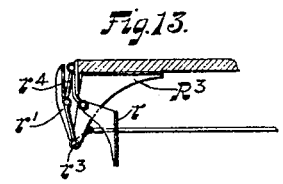
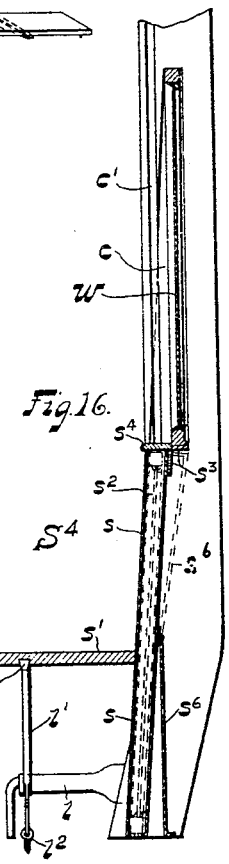
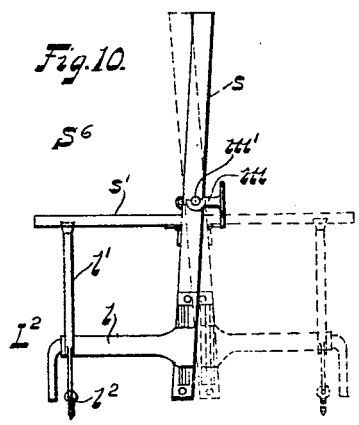
Witnesses:
Edw. Lindmueller.
Jno. F. Oberlin.
Inventor,
George J. Knoll
By J. B. Fay
His Attorney.

No. 871,419. PATENTED NOV. 19, 1907.
G. J. KNOLL.
CONVERTIBLE STREET CAR.
APPLICATION FILED OCT. 23, 1905.
5 SHEETS—SHEET 5.
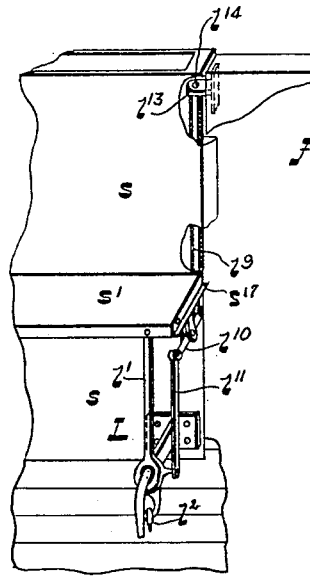
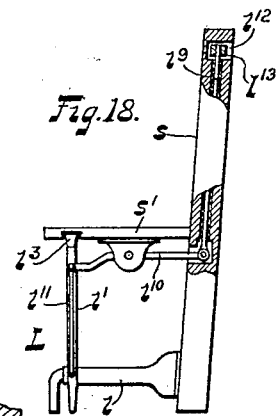
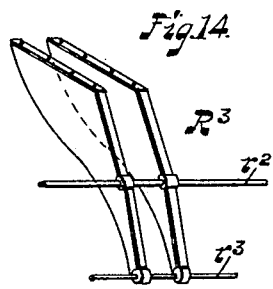
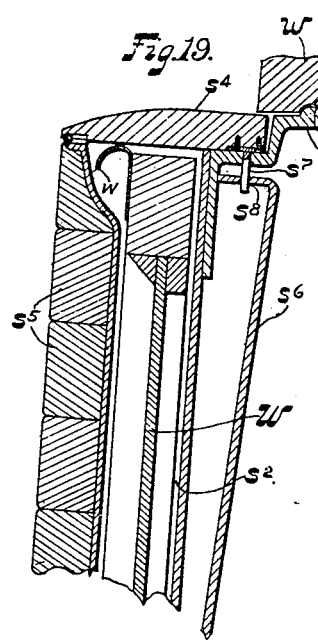
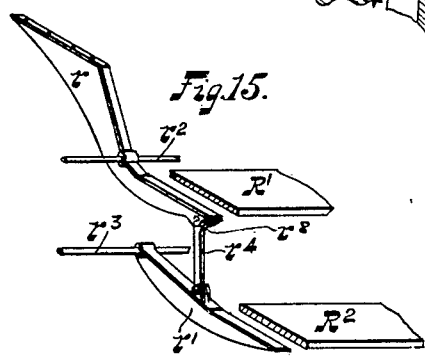

UNITED STATES PATENT OFFICE.

GEORGE J. KNOLL, OF CLEVELAND, OHIO.

CONVERTIBLE STREET-CAR.

No. 871,419.     Specification of Letters Patent.     Patented Nov. 19, 1907.

Application filed October 23, 1905. Serial No. 283,905.

*To all whom it may concern:*

Be it known that I, GEORGE J. KNOLL, a citizen of the United States, resident of Cleveland, county of Cuyahoga, and State of Ohio, have invented a new and useful Improvement in Convertible Street-Cars, of which the following is a specification, the principle of the invention being herein explained and the best mode in which I have contemplated applying that principle, so as to distinguish it from other inventions.

My invention relates to improvements in street-cars and particularly to street cars of the convertible type. Its object is to provide a convertible car in which for summer use the seats may be arranged transversely and the sides of the car left open; and in which for winter use, without the removal from or addition to the car of parts other than those constantly borne thereby, such seats may be arranged to extend longitudinally along the sides of the car and such sides may be inclosed so as to be weather proof.

It is a further object to provide a car in which such convertibility shall exist, without departing in any large degree from approved modern types of street car structure and design. As it is necessary, in order to use a summer car having transverse seats, that a running board be provided for the ready ingress and egress of passengers, while such board is apt to be an encumbrance when the car is closed for winter use, my invention further includes a running board of novel design which can be folded up out of the way when the car is closed.

To the accomplishment of the above and other minor objects, my invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings:—Figure 1 represents a plan view of the interior of a car embodying my invention such car being in its closed form for winter use. Fig. 2 represents a vertical transverse section of the same. Fig. 3 represents in perspective one of the intermediate seats of such car arranged transversely across the car. Fig. 4 is a view similar to Fig. 3 except that such seat is there shown in its longitudinal position. Fig. 5 is a perspective view of a rear end seat designed to coöperate with the type of intermediate seat just referred to; Fig. 6 represents such rear seat in its folded condition; while Fig. 7 shows a detail in connection with such rear end seat. Fig. 8 is a perspective view of the front end seat in my improved car; Fig. 9 shows a detail of the same; and Fig. 10 represents an end elevation thereof. Fig. 11 is a perspective and diagrammatic view of the running board forming a feature of my invention; Figs. 12 and 13 are end views of the same in its open and closed position respectively; while Figs. 14 and 15 show certain details entering therein. Fig. 16 represents a cross section of one of the intermediate seats; Figs. 17, 18 and 19 show structural details of such seat; Fig. 20 represents a hinge upon which such seat is secured while Figs. 21 and 22 show a catch employed in connection with such seat. Fig. 23 is a perspective view of a section of such intermediate seat modified in the manner and for a purpose hereinafter to be explained.

The type of car shown in Figs. 1 and 2, and to which the majority of the details shown in the other figures conform, is that commonly employed upon double-track systems in our cities. It comprises a car-body A provided with a front platform B and a rear platform B' with fixed steps $b$ and $b'$ respectively leading thereto. A portion of the front platform is partitioned off by a panel $b^2$ and sliding door $b^3$ to form the motorman's cab, and a front door $b^4$ and rear door $b^5$ provide means of entrance and exit for the interior of the car when the sides are closed. At corresponding intervals on each side of the car are posts or stanchions C. These intervals are all equal with the exception of the one between the front post and the post adjacent thereto which is somewhat greater than the others, since a rearwardly-facing seat is provided across the front end, as is usual. Also at the rear a supplementary post C' is provided as shown in Fig. 1. The left or "devil strip" side of the car is permanently closed intermediately of such posts by means of panels D which extend to the height of the seat backs. These panels contain pockets in which the windows W are carried when not in use, a cap being provided which serves both as a closure for such pocket and as a ledge for the window when raised, as will be readily understood.

When it is desired to close the car on the other side the panels D' corresponding to permanent panels D are supplied by the backs of the intermediate seats S in the manner shortly to be explained, while other windows W are adapted to rest in pockets formed in the backs of such seats and to be raised, when such seats are disposed longitudinally, in the same way as the windows on the "devil strip" side. Where it is desirable to have the car doubly convertible, as may be the case on a single-track system, instead of having permanent panels with window pockets on the left side, this side may also be closed by the backs of the seats designed to be arranged along such side when the car is in its closed condition. The drawings, and hence the description thereof, relate as has been stated for the most part to the first of the above types of cars, i. e. a car permanently closed against entrance or exit on one side. My invention, however, as will be shown, is readily adapted to conform with the conditions imposed by either car structure.

The intermediate seat S of my car comprises primarily two end sections $S^3$ and $S^4$ pivotally secured at their outer ends so as to readily swing rearwardly, from a transverse position to a position along the sides of the car. The length of each of these sections is the same and is such that, when arranged thus longitudinally, the ends of adjacent sections just meet so as to form a continuous seat along each side of the car. Inasmuch as, when arranged transversely, these sections would not be long enough to extend entirely across a car of the width now commonly employed, it is necessary to provide an auxiliary section $S^5$ adapted to fill up such intermediate space. The relative positions of such sections is shown in Fig. 1, the full lines representing the seats as arranged longitudinally, the broken lines as arranged transversely.

The seat sections $S^3$ and $S^4$ are each made up of a seat-back $s$ which extends down to the floor, and a seat-bottom $s'$ permanently attached thereto, Figs. 3 and 4. The back $s$ is slightly inclined towards the rear in order to provide a more comfortable rest for passengers. In the case of the seat-sections $S^3$ pivoted along the convertible, right side of the car, the back $s$ is somewhat wider than in sections $S^4$ on the other side, and contains a pocket $s^2$ which, as has already been indicated, is designed to contain a window W, Fig. 16. As this window is of just the proper width to fit between two adjacent stanchions C it is evident that the pocket $s^2$ will be shorter than the seat section, since the aggregate length of such sections must equal the sum of such inter-post distances plus the width of the posts. This allows for a sufficiently strong framework at the ends of the seat-backs to render the seat-structure durable.

The lower portions of the posts C are recessed to a height equal to that of the seat-backs and at an angle and to a depth that will allow the seat-backs to lie flush with the inside faces of such posts, Fig. 4. It is readily seen that when the seat-back is in this position, the window, as it is withdrawn from its pocket, will lie between the posts, being prevented from falling away by grooves $c$ formed in the sides of the posts. Each of such grooves, as shown in Fig. 16, is wider at the bottom than at the top where it is just wide enough to accommodate the top of the window-sash when raised, the inner line of the groove being in line with the inner line of the pocket $s^2$ while the outer line of the groove is very nearly perpendicular. Thus when the window has been raised to its full extent so as to be entirely free from the seat-back $s$ its lower portion can be swung outwardly until the sides contact with the outer perpendicular line of the groove $c$. The window rests, when in this position, partly upon a ledge $s^3$ attached to the outside of the seat-back and partly upon a lid or cap $s^4$ which is hinged to the inside edge of the seat-back, and, which in addition to the purpose just indicated, serves to close the window-pocket $s^2$ in both positions of the seat. A tongue $s^{15}$ upon ledge $s^3$ is adapted to register in a groove $s^{16}$ in the bottom of window-sash W and so make the junction between window and seat weather-tight. The window shade, which is not shown, is designed to slide in grooves $c'$, Fig. 3, in the usual manner, such grooves being deeper than grooves $c$ and extending the entire length of the posts. When the panel is closed such shade can be lowered in front of the window, while with the seats transversely arranged it can be drawn down to the floor to serve as a temporary shield from the weather.

As shown in Fig. 19, the preferable material of which to make such seat would be steel sheets stamped into the proper form and faced on the front with wooden strips $s^5$ disposed in the customary manner. Inasmuch as the rear surface of the seat-backs when in the transverse position is always liable to be scratched and otherwise marred by passengers in the seat next behind, I provide a panel $s^6$ of width equal to the space between adjacent stanchions and of a height equal to half that of such seat-back. This panel is hinged as shown in Fig. 16 whence it is evident that it can be allowed either to occupy the lower position there shown or be swung upwardly against the upper part of the seat-back in which position it is held as indicated in Fig. 19, by a pin $s^7$ on the under side of lid $s^4$ which is adapted to register in an aperture $s^8$ provided in the inturned edge of the panel. This panel is intended to occupy its lower position when the seat is ranged longitudinally so that its inner face and the portion of the seat-back normally covered thereby will be exposed. These faces may be suitably painted after the fashion of the outer panels of a car. The hinged panel $s^6$ serves further, when in its lower position, to render the junction of the seat back with the posts and car floor more thoroughly weather proof. To facilitate the withdrawal of the window from its pocket it is provided with a metal finger-piece or leather tab $w$ attached to the upper part of the sash as shown in Fig. 19.

The hinges H on which the outer seat sections are mounted each comprise two members, as shown in Figs. 4 and 20, the one a curved or angular member $h$ adapted to be secured to the inside surface of the adjacent stanchion and provided with an integral horizontal plate $h^2$ adapted to be secured to the car floor, the other $h'$ adapted to be secured to the inside of the seat-section back and provided with a horizontal plate $h^3$ attached to the under side of the seat bottom and extending across the top of member $h$. These two members are suitably secured together by a vertical hinge pin $h^4$. By virtue of the peculiar structure of this hinge the backs $s$ of the seat-sections corresponding to adjacent stanchions C are brought into register with the recesses in such stanchions and into perfect alinement with the side of the car when the seats are in their horizontal position; while the two sections corresponding to oppositely situated stanchions fall into like perfect alinement when the seats are transversely arranged. As shown in Fig. 3 the seats when in this last position have their ends closed by such opposite stanchions. This relation of seat to stanchion, however, may be varied by changing the length of the arms of angular member $h$ of the hinge.

To support and firmly secure seat-sections $S^3$ and $S^4$ in either of the positions which they are adapted to occupy, I provide a leg L of novel construction, Figs. 3, 17, and 18. This leg is designed to be attached to the free end of such seat-sections and comprises two members, one a bracket $l$ attached to the inner face of the seat-back $s$ near its lower corner and having its outer end bent downwardly so as to rest on the car floor; the other, a leg $l'$ pivotally mounted on such bracket near its outer end and adapted to swing in a vertical plane at right angles to such bracket. This leg is provided with a lower recurved end adapted when the leg is vertically positioned to engage an eye-bolt $l^2$ secured in the car floor. Two such eye-bolts are provided for each seat-section, one to be thus engaged when the section occupies its longitudinal position, the other, when the section occupies its transverse position. The upper end of leg $l'$ is in the form of a flaring tongue $l^3$ adapted, when the leg is in the aforementioned vertical position, to dovetail into a recessed slot $l^4$ cut in the under side of the seat-bottom $s'$. A spring-bolt $l^5$ having a projecting knob $l^6$ is provided to lock such upper end of leg-member $l'$ in slot $l^4$, as shown in Figs 21 and 22, which are vertical and horizontal transverse sections respectively of such slot and bolt with the leg-member appearing therein in its locked position. The bolt normally projects into the slot, and has its inner end curved on one side so that it will be shoved back by the leg as it is swung into place. To release the leg the bolt is temporarily withdrawn from the slot by pressure on knob $l^6$.

The auxiliary seat-section $S^5$ may take either of two forms accordingly as to whether the "devil strip" side of the car is closed by permanent weather panels or not. The construction designed for use in the closed form will first be described. As shown in Figs. 3 and 4, auxiliary section $S^5$ like the end-sections comprises a seat-back $s$ and a seat-bottom $s'$. Seat-back $s$ of such auxiliary section does not extend down to the car floor but terminates on a plane with the upper surface of seat-bottom $s'$. Furthermore it is not independently supported, but is hinged to the adjacent back of seat-section $S^4$ so as to be adapted by swinging rearwardly to lie against the rear surface of such section $S^4$. The bottom $s'$ of auxiliary seat $S^5$ is in turn hinged to such seat-back, and while supported by the adjacent ends of the seat-bottoms of sections $S^3$ and $S^4$ when the latter are transversely arranged, Fig. 3, is adapted upon the turning of such sections into their other position to drop into a plane with its seat-back $s$ and to be carried by the latter against the rear surface of section $S^4$, Fig. 4. Accordingly when such section $S^4$ is swung back against permanent weather-panel D, the auxiliary seat $S^5$ is entirely hidden from view and conveniently out of the way.

To sustain the bottom of auxiliary seat $S^5$ when in service the inner ends of the bottoms of seat-sections $S^3$ and $S^4$ are provided with projecting tongues or flanges $s^7$, on which such seat-bottom rests; and to lock them in place thereon the device shown in Fig. 21 is employed. This device comprises simply a spring-bolt $l^7$ embedded in the end of the bottom member of each end seat section so as to normally project into slot $l^4$ with which upper end $l^3$ of leg-member $l'$ is adapted to register. When such leg-member is swung to thus register in the slot, it forces the bolt $l^7$ to project beyond the end of the seat-bottom and register in a suitable aperture $l^8$ provided in the end of the adjacent seat-bottom in the manner clearly shown in said Fig. 21. A device, likewise adapted to be operated by the movement of leg-member $l'$, is designed to secure the free end of the back of such auxiliary seat $S^5$ to the adjacent end of the back of seat-section $S^3$, Figs. 17 and 18. In a vertical passage formed in the end of the back of section $S^3$ is slidably mounted a rod or bolt $l^9$ connected at its lower end with leg-member $l'$ by means of a suitably pivoted lever $l^{10}$ and connecting rod $l^{11}$. A recess $l^{12}$ in the upper part of the seat-back intersects the passage in which bolt $l^9$ is thus made to reciprocate, and a projecting lug $l^{13}$ on the back of auxiliary seat $S^5$ is adapted to register in this recess. Such lug is provided with an aperture which coincides in position with the aforesaid vertical passage so that bolt $l^9$ upon being raised will engage the lug and so lock the two seat-backs together. Lever $l^{10}$ is connected to thus raise bolt $l^9$ when leg-member $l'$ is swung into slot $l^4$ which movement is incidental to hooking the lower end of the leg into eyebolt $l^2$ and which simultaneously actuates spring-bolt $l^7$ to lock the seat-bottoms together as has been described.

Apertures in the outer ends of sections $S^3$ and $S^4$ are adapted to receive spring-bolts $l^7$ when the seats are longitudinally arranged; while eyes $c^2$ properly located near the upper ends of the recesses in posts C are adapted to register in recesses $l^{12}$ and receive bolts $l^9$ when the seats are similarly arranged.

When seat-sections $S^4$ as well as $S^5$ are utilized to form weather-panels and contain pockets for windows, the posts on this side of the car have to be also recessed in the manner already set forth and the auxiliary seat instead of being folded behind the section is folded in the manner shown in Fig. 23. That is, the back of such auxiliary section instead of swinging rearwardly, swings forwardly against the front of section $S^4$, the bottom being hinged so as to fold over upon the bottom of such section $S^4$ and retain the back in place.

The seats $S'$ and $S^2$ at the front and rear ends of the car, respectively, while embodying certain features common to the intermediate seats just described, depart therefrom in certain others. Thus the front seat $S'$, Fig. 1, comprises but two sections, $S^6$, both of the same length, and adapted to form either a single transverse seat facing towards the rear of the car, or two longitudinal sections each covering the space between a front post and the post adjacent thereto which space, as has been indicated, is greater than that covered by the intermediate seat sections. Each of the front seat sections comprises a seat-back $s$ similar in construction to the backs of the intermediate seats attached to the same side of the car. Such back is pivotally secured at one end about midway of its height to one leaf $k$ of a hinge K the other leaf $k'$ of which is attached to the inside of the front corner post, see Fig. 8, where the right-hand seat is shown in its longitudinal position. The end of the seat which is thus attached to hinge K is provided with a rim-bearing flange $K'$ which incloses hinge leaf $k$ and through which the pivot pin $k^2$ passes as clearly shown in Fig. 9. The object of this rim-bearing flange is to further strengthen the joint, by confining the hinge leaf $k$ in the slot $k^3$ thus formed. By the foregoing construction the back of such front seat section may not only be swung into either a transverse or longitudinal position, but may be inclined in one direction in one position and in the other in the second position, as is obviously necessary. A seat-bottom $s'$ is provided on each side of the back $s$, being hinged thereto, as shown in Fig. 8, so as to be readily folded close up against such back. To support such seat-bottom in its raised position a folding leg $L'$ is pivotally secured to its under side near the end adjacent to hinge K, while a leg $L^2$, similar to leg L of the intermediate seats, is designed to support the other end. This leg $L^2$ differs from leg L only in that member $l$, instead of being fixed to the seat-back, is pivotally attached thereto permitting the leg to be swung to either side of the back to support either seat-bottom $s'$ as may be desired, depending upon whether the seat is ranged transversely or longitudinally of the car; see Fig. 10 where the inside end of the left-hand (i. e. devil-strip side) section is represented as such section appears when transversely positioned. In this figure is also shown a bracket $m$ which is secured to the front end of the car and is designed to engage a projecting lug $m'$ on the end of the seat-back to assist eye-bolt $l^2$, which leg $L^2$ engages, in retaining the seat in its place. The side of seat back $s$ that forms the outside of the car when the seat section is longitudinally arranged is provided, in addition to hinged seat-bottom $s'$, with a hinged panel $s^6$, not shown, which is utilized, as in the sections $S^3$, to present one surface when in its upper position and the other when in its lower position, in which latter position it further serves to protect the seat-bottom $s'$ from the weather.

The rear seat differs from both the intermediate and front seats in that, when the car is converted for winter use, it is folded entirely up. The reason for this will appear upon consulting Fig. 1, where t is seen that the intermediate and front seats, when arranged longitudinally in the manner before described, extend the entire length of the car. To furnish the small amount of space required by the rear seat when in its folded condition a supplementary post $C'$ is introduced, or the last side panel otherwise slightly lengthened. As the rear seat is decorner, Figs. 1 and 6, I provide a small permanent seat $S^7$ in the opposite corner, which otherwise would be vacant. The bottom $s'$ of this seat is hinged to the back $s$ and provided with a folding leg. When dropped down, such seat bottom forms a support for one end of the rear seat, see Fig. 5. Such rear seat as clearly shown in the same figure comprises two sections $S^8$ and $S^9$, whose bottom members $s'$ are hinged together and whose back members $s$ are respectively hinged to said bottom members. In addition to being hinged to the other bottom member, the bottom member of section $S^8$ is hinged to a support $s^{10}$ which in turn is adapted to swing on a vertical axis, preferably by being hinged to the rear corner post in the manner indicated in Fig. 5. The foregoing construction, it is readily seen, permits the two seat sections to be folded together and the whole then turned, by virtue of the pivotal attachment of support $s^{10}$ into the position indicated in Figs. 1 and 6. A catch $s^{12}$ is designed to retain the seat in this position, which, as before stated, is the one it occupies when the car is closed. To sustain the seat when extended, a folding leg $s^{11}$ is attached to the bottom member of section $S^9$, while further rigidity is obtained by having the adjacent ends of the backs of the two sections $S^9$, $S^8$ provided with registering tongue $s^{13}$ and groove $s^{14}$ respectively.

The running board R, which forms a feature of my improved car, extends between the permanent end steps $b$, $b'$, Fig. 1, and is designed to be readily folded up when not in use or at such other times as may prove desirable. As shown, Figs. 11, 12 and 13, such running board comprises two treads $R'$ and $R^2$ respectively mounted on two series of pivoted arms $r$ and $r'$. Arms $r$ are thus pivoted on a shaft $r^2$ supported by brackets $R^3$ secured to the under side of the car body, and each is provided with a rearwardly extending portion adapted to rest against such under side of the car body when the treads borne thereby are horizontal. Arms $r'$ are keyed to a rock-shaft $r^3$ journaled in bearings formed in the lower ends of such brackets $R^3$ substantially directly below shaft $r^2$. The outer end of each arm $r$ is connected with the corresponding arm $r'$ below it by means of a short bar or rod $r^4$ pivotally secured on a lug on the under side of arm $r$ and to a similar lug on the top of arm $r'$. The arm $r'$ is thus supported by arm $r$ when the latter rests against the under side of the car body, such bar or link $r^4$ being provided at its upper end with a lug $r^8$ upon which the outer end of arm $r$ rests giving further rigidity to the structure; it is also seen that an upward movement of arm $r'$ will be communicated to arm $r$, the effect of such movement being to fold up the running board as shown in Fig. 13. Such movement of arm $r'$, and consequent folding of the running board, is effected by a lever arm $r^5$, keyed to rock-shaft $r^3$ and adapted to be actuated from the motorman's cab by means of an operating handle $r^6$ and a suitable system of connecting bars and levers $r^7$ as diagrammatically shown in Fig. 11.

It is of course understood that the form of brackets $R^3$, and of the arms pivotally mounted in connection therewith, is not essential. As shown, Fig. 14, the bracket $R^3$ comprises two similar adjacent members between which arm $r$ is designed to lie; one of said members might be dispensed with or both united into an integral structure as found most practicable.

It only remains to indicate in a general way the procedure to be followed in converting my improved car from one form to the other. Assuming the car to be of the type used on double-track systems, and further that it is in condition for summer use, the arrangement of the seats is indicated by broken lines in Fig. 1; and the appearance of the intermediate and rear seats is respectively shown in Figs. 3 and 5, while an end view of the left hand section of the front seat appears in Fig. 10. To convert the car to the winter form, the rear seat $S^2$ would first be folded up, Fig. 6, and each auxiliary seat-section $S^5$ would then be folded behind the corresponding left-hand end-section $S^4$; as a preliminary to this step the legs $l'$ of end sections $S^3$ and $S^4$ would have to be tilted to free such auxiliary section, which would likewise leave such end sections in condition to be swung back along the sides of the car, where they would be secured by returning legs $l'$ into slots $l^4$ and at the same time hooking the lower ends of such legs in eye-bolts $l^2$. Each of the two sections $S^6$ of the front seat would next be turned outwardly and the inclination of their backs be changed; the bottom section on the outside would then be dropped, and the other bottom section raised, the pivoted leg L being brought around to support the same. The transformation is now complete with the exception of dropping the several hinged weather-panels $S^6$ and raising the windows W from their respective pockets.

Where both sides are convertible the only departure from the above procedure would be in the manner of folding up auxiliary seat section $S^5$ which has been previously described. The running board R would of course be extended or folded up to correspond with the arrangement of the car. Such running board need not be operable from the motorman's cab where the change from winter to summer form and vice versa is only occasional, but may be folded up directly and secured by hooks or equivalent means; the object in having it thus operable is to facilitate its folding up in crossing narrow bridges and the like where there is not room sufficient to allow the ready passage of an open car with running board extended and in similar situations where it would be inconvenient to alight from the car and manually arrange the board.

Having thus described my invention in detail, that which I particularly point out and distinctly claim is:—

1. In a car, seats forming the sides thereof and pivoted to turn in a horizontal direction, substantially as described.

2. In a car, seats forming the sides thereof and pivoted to turn in a horizontal direction and windows slidably contained in said seats, substantially described.

3. In a car, seats forming the sides thereof and pivoted to turn in a horizontal direction, window guides on said seats and windows slidably contained in said seats, substantially described.

4. In a car, seats forming the sides thereof and pivoted to turn in a horizontal direction, window guides on said seats, windows slidably contained in said seats, posts and window guides on said posts, substantially described.

5. In a convertible car, a seat comprising two end sections adapted to be transversely and longitudinally arranged, and an auxiliary section adapted to connect said end sections when transversely arranged.

6. In a convertible car, a seat comprising two end sections adapted to be transversely and longitudinally arranged, and an auxiliary section adapted to connect such end sections when transversely arranged, and to fold against one of such sections when longitudinally arranged.

7. In a convertible car, a seat comprising two end sections adapted to be transversely and longitudinally arranged and an auxiliary section adapted to connect said end sections when transversely arranged and embodying a back member, hinged to one of said end sections, and a bottom member hinged to said back member.

8. In a convertible car, a seat comprising two end sections pivoted vertically and adapted to be transversely and longitudinally arranged, and an auxiliary seat adapted to connect said end sections when transversely arranged.

9. In a convertible car, a seat comprising two end sections pivoted vertically and adapted to be transversely and longitudinally arranged, and an auxiliary seat adapted to connect said end sections when transversely arranged and to fold behind one of said end sections when longitudinally arranged.

10. In a convertible car, a seat comprising two end sections pivoted vertically and adapted to be transversely and longitudinally arranged, and an auxiliary section adapted to connect said end sections when transversely arranged and embodying a back member hinged to one of said end sections, and a bottom member hinged to said back member.

11. In a convertible car, a seat comprising two end sections adapted to be transversely and longitudinally arranged, and an auxiliary section adapted to connect said end sections when transversely arranged, and embodying a back member hinged to the back of one of said end sections and a separate bottom member hinged to the bottom of one of said end members.

12. In a convertible car, a seat comprising two end sections pivoted vertically and adapted to be transversely and longitudinally arranged, and an auxiliary section adapted to connect said end sections when transversely arranged and embodying a back member hinged to the back of one of said end sections and a separate bottom member hinged to the bottom of said same end section.

13. In a convertible car, a set of seats each comprising two end sections pivoted vertically and adapted to close the space along the sides of such car when such sections are arranged longitudinally and to extend only partially across such car when such sections are arranged transversely, and an auxiliary section adapted to connect said sections when arranged transversely.

14. In a convertible car, the combination of two adjacent transverse seats having a space between them, an auxiliary seat adapted to connect such seats, and comprising a back member pivotally attached to the back of one of said transverse seats so as to swing behind the same and a bottom member pivotally attached to such back member.

15. In a convertible car, the combination of two adjacent transverse seats having a space between them, and comprising main back members and main bottom members attached thereto, an auxiliary back member hinged to one of said main back members and adapted to register with said other main back member, means for securing said auxiliary back member in such registering position, an auxiliary bottom member hinged to said auxiliary back member and adapted to register with said main bottom member, and means for retaining said auxiliary bottom member in such registering position.

16. In a convertible car, the combination of two adjacent transverse seats having a space between them, and comprising main back members and main bottom members attached thereto, an auxiliary back member hinged to one of said main back members so as to swing forwardly against the front thereof and adapted to register with the other of said main back members, means for retaining said auxiliary back member in such registering position, an auxiliary bottom member hinged to one of said main bottom members so as to swing over upon the same and adapted to register with the other of said main bottom members, and means for retaining said auxiliary bottom member in such registering position.

17. In a convertible car, the combination with the front end wall of such car of a pivotally mounted seat adapted to be arranged transversely with its back against said wall and longitudinally with its back against a side of such car.

18. In a convertible car, the combination with the end wall of such car, of a seat comprising two sections pivoted vertically and adapted to be arranged transversely along said end wall and longitudinally along the sides respectively of such car.

19. In a convertible car, a seat comprising a back member pivoted both vertically and horizontally and a folding bottom member on each side of said back member.

20. In a convertible car, a seat comprising two sections each embodying a back member pivoted vertically and horizontally and a folding bottom member on each side of said back member.

21. In a convertible car, the combination with the end wall of such car, of a seat comprising two sections pivoted vertically and adapted to be arranged transversely along said end wall and longitudinally along the sides respectively of such car, the backs of such sections being adapted to incline in one direction in said first position and in another direction in said second position.

22. In a convertible car, the combination with the end wall of such car, of a seat comprising two sections each embodying a back member pivoted vertically whereby it is adapted to be arranged transversely along said end wall and longitudinally along the respective sides of such car, such member being also pivoted horizontally whereby it is adapted to be inclined in one direction in said first position and in another direction in said second position.

23. In a convertible car, the combination with the end wall of such car, of a seat comprising two sections each embodying a back member pivoted vertically whereby it is adapted to be arranged transversely along said end wall and longitudinally along the respective sides of such car, such member being also pivoted horizontally whereby it is adapted to be inclined in one direction in said first position and in another direction in said second position, and a folding bottom member on each side of said back member.

24. In a convertible car, a seat comprising a back member vertically pivoted at one end, two bottom members, one on each side of said back member and hinged thereto, and a leg pivotally attached to the free end of said back member and adapted to alternately support each of said bottom members.

25. In a convertible car, a seat comprising a back member vertically pivoted at one end, two bottom members, one on each side of said back member and hinged thereto, a leg pivotally attached to the free end of said back member and adapted to alternately support each of said bottom members, and a folding leg attached to each of said bottom members and adapted to additionally support the same.

26. In a convertible car, a seat comprising a supporting member, a bottom member hinged thereto at one end, and a back member hinged to said bottom member.

27. In a convertible car, a seat comprising a vertically pivoted supporting member, a bottom member hinged thereto at one end, and a back member hinged to said bottom member.

28. In a convertible car, a seat comprising a supporting member, a bottom member hinged thereto at one end, a second bottom member hinged to the other end of said first bottom member, and two back members respectively hinged to said bottom members.

29. In a convertible car, a folding seat comprising a vertically pivoted supporting member, a bottom member hinged thereto at one end, a second bottom member hinged to the other end of said first bottom member, and two back members respectively hinged to said bottom members.

30. In a convertible car, a folding seat comprising a vertically pivoted supporting member, a bottom member hinged thereto at one end, a second bottom member hinged to the other end of said first bottom member, two back members respectively hinged to said bottom members, and means adapted to secure the adjacent ends of said back members together when said seat is extended.

31. In a convertible car, a seat comprising a supporting member, a bottom member hinged thereto at one end, a second bottom member hinged to the other end of said first bottom member, and two back members respectively hinged to said bottom members, the adjacent ends of said back members being respectively provided with a groove and a tongue adapted to engage said groove when said seat is extended.

32. In a convertible car, the combination with a folding transverse seat, of a longitudinal seat provided with a hinged bottom member adapted in its raised position to register with the bottom member of the adjacent longitudinal seat, and in its lowered position to support the end of such transverse seat.

33. In a convertible car, the combination of a supporting member, a seat hinged thereto at one end, and a second seat at right angles to said first seat and comprising a hinged bottom member adapted in its lowered position to support the other end of said transverse seat.

34. In a convertible car, a seat comprising two end sections pivoted vertically whereby they are adapted to be arranged transversely of said car and to be arranged longitudinally along the respective sides thereof, such sections being adapted in the latter position to close the space between adjacent posts.

35. In a convertible car, a seat comprising two end sections pivoted vertically whereby they are adapted to be arranged transversely of said car and to be arranged longitudinally along the respective sides thereof, such sections being adapted in the latter position to close the space between adjacent posts and being provided with pockets and windows in such pockets adapted to slide between such adjacent posts.

36. In a convertible car, the combination with two adjacent roof-supporting posts along its side, such posts being recessed on their inner faces for a portion of their height from the floor, of a seat pivoted vertically whereby it is adapted to be arranged transversely of said car and longitudinally along its side, the back of such seat being adapted in the latter position to lie in the recesses in said posts and to close the space between the same.

37. In a convertible car, the combination with two adjacent roof-supporting posts along its side, such posts being recessed on their inner faces for a portion of their height from the floor, of a seat pivoted vertically whereby it is adapted to be arranged transversely of said car and longitudinally along its side, the back of such seat being adapted in the latter position to lie in the recesses in said posts and to close the space between the same, and being provided with a pocket and a window in such pocket adapted to slide between such adjacent posts.

38. In a convertible car, the combination with two adjacent roof supporting posts along its side, such posts being recessed on their inner faces for a portion of their height from the floor and being provided on their opposing faces with longitudinal grooves, a seat pivoted vertically whereby it is adapted to be arranged transversely of said car and longitudinally along its side, the back of such seat being adapted in the latter position to lie in the recesses in said posts, and to close the space between the same, and being provided with a pocket and a window in such pocket adapted to slide in the grooves on the opposing faces of such adjacent posts.

39. In a convertible car, the combination with two adjacent roof-supporting posts along its side, such posts being recessed on their inner faces for a portion of their height from the floor and being provided on their opposing faces with longitudinal grooves leading upwardly from such recesses, a seat pivoted vertically whereby it is adapted to be arranged transversely of said car and longitudinally along its side, the back of such seat being adapted in the latter position to lie in the recesses in said posts, and to close the space between the same, and being provided with a pocket and a window in such pocket adapted to slide in the grooves on the opposing faces of such adjacent posts.

40. In a convertible car, a seat having a pocket in its back, a window resting in such pocket, a ledge along the outer side of said pocket, and a cap hinged along the inner side of said pocket and adapted to close the same, said window being designed when raised to cover the adjacent edges of said ledge and said cap.

41. In a convertible car, a seat, a panel longitudinally hinged on the back of said seat and adapted normally to hang in a downward position and thereby cover the lower portion of such back, and means adapted to retain such panel in an upturned position whereby its other surface is exposed and the upper portion of such back covered.

42. In a convertible car, a seat having a pocket in its back, a window resting in such pocket, a ledge along the outer side of such pocket, a panel longitudinally hinged on the back of said seat and adapted normally to hang in a downward position and a cap hinged along the inner side of said pocket and adapted to close the same, and when thus closed to secure said panel in an upturned position.

43. In a convertible car, a running board comprising downwardly extending brackets, arms pivotally mounted on said brackets, and having rearwardly extending portions adapted to rest against the bottom of such car, and a tread attached to the forwardly extending portions of such arms.

44. In a convertible car, a running board comprising downwardly extending brackets, arms pivotally mounted thereon so as to swing vertically and adapted to rest normally in a horizontal position, other arms pivotally mounted on said brackets below said first-named arms and links connecting said first and last-named arms whereby the latter are supported by the former, and two treads respectively attached to said first and last-named arms.

45. In a convertible car, a running board comprising downwardly extending brackets, arms pivotally mounted on said brackets so as to swing vertically and having rearwardly extending portions adapted to rest against the bottom of such car, a tread attached to the forwardly extending portions of such arms, other arms pivotally mounted on said brackets below said first-named arms and linked to the latter, and a second tread attached to said last named arms.

46. In a convertible car, a running board comprising downwardly extending brackets, arms pivotally mounted on said brackets so as to swing vertically and having rearwardly extending portions adapted to rest against the bottom of such car, a tread attached to the forwardly extending portions of such arms, other arms pivotally mounted on said brackets, below said first-named arms and linked to the latter, a second tread supported by said last-named arms, and means for turning said arms upon their pivotal axis.

47. In a convertible car, a running board comprising downwardly extending brackets, arms pivotally mounted on said brackets so as to swing vertically and having rearwardly extending portions adapted to rest against the bottom of such car, a tread attached to the forwardly extending portions of said arms, other arms pivotally mounted on said brackets below said first-named arms, links connecting said first and last-named arms whereby the latter are supported by the former, and a second tread attached to said last-named arms.

48. In a convertible car, a running board comprising downwardly extending brackets, arms pivotally mounted thereon so as to swing vertically and having rearwardly extending portions adapted to rest against the bottom of such car, a rock-shaft mounted in said brackets below such arms, other arms keyed to such rock-shaft, links connecting said first and last-named arms, and two threads respectively attached to said first and last-named arms.

49. In a convertible car, a running board comprising downwardly extending brackets, arms pivotally mounted thereon so as to swing vertically and having rearwardly extending portions adapted to rest against the bottom of such car, a rock-shaft mounted in said brackets below such arms, other arms keyed to such rock-shaft, links connecting said first and last-named arms, two treads respectively attached to said first and last-named arms, and means for rocking said shaft.

50. In a convertible car, a running board comprising downwardly extending brackets, arms pivotally mounted thereon so as to swing vertically and having rearwardly extending portions adapted to rest against the bottom of such car, a rock-shaft mounted in said brackets below such arms, other arms keyed to such rock-shaft, links connecting said first and last-named arms, two treads respectively attached to said first and last-named arms, an operating lever in the motorman's cab of such car, and a system of levers and rods connecting the same with said rock-shaft.

51. In a convertible car, the combination with a seat of means for securing the same to the car floor, such means comprising a bracket attached to the back member of such seat and a leg pivotally mounted upon said bracket and adapted to engage such car floor with its lower end and the bottom member of such seat with its upper end.

52. In a convertible car, the combination with a seat of means for securing the same to the floor of such car, such means comprising an eye in such floor, a bracket attached to the back member of such seat and projecting over said eye, and a leg pivotally mounted upon said bracket and adapted when vertically positioned to engage said eye with its lower end and the bottom member of such seat with its upper end.

53. In a convertible car, the combination with a seat having a recessed slot on the under side of its bottom member, of means for securing such seat to the car floor, such means comprising an eye in such floor, a bracket attached to the back member of said seat and projecting over said eye, and a leg pivotally mounted upon said bracket and adapted when vertically positioned to engage said eye with its lower end and said recessed slot with its upper end.

54. In a convertible car, the combination with a seat having a recessed slot on the under side of its bottom member, of means for securing such seat to the car floor, such means comprising an eye in such floor, a bracket attached to the back member of said seat and projecting over said eye, a leg pivotally mounted upon said bracket and adapted when vertically positioned to engage said eye with its lower end and said recessed slot with its upper end, and a catch adapted to retain said leg in such vertical position.

55. In a convertible car, the combination with a seat having a recessed slot on the under side of its bottom member, of means for securing such seat to the car floor, such means comprising an eye in such floor, a bracket attached to the back member of said seat and projecting over said eye, a leg pivotally mounted upon said bracket and adapted when vertically positioned to engage said eye with its lower end and said recessed slot with its upper end, and a spring bolt normally projecting into said slot and adapted to retain such upper end of said leg therein.

56. In a convertible car, the combination with a seat, of means for securing the same to the car floor, such means comprising a bracket pivotally attached to the end of the back member of such seat so as to swing to either side thereof, and a leg pivoted upon said bracket and adapted when vertically positioned to engage such car floor with its lower end and the bottom member of such seat with its upper end.

57. In a convertible car, the combination with two seats adapted to be contiguously placed of means for securing them in such position, such means comprising a vertical passage in the back member of one of said seats, a slot intersecting the same, a lug on the back member of the other of said seats adapted to register in said slot, and a bolt in said vertical passage adapted to engage such lug.

58. In a convertible car, the combination with two seats adapted to be contiguously placed of means for securing them in such position, such means comprising a vertical passage in the back member of one of said seats, a slot intersecting the same, a lug on the back member of the other of said seats adapted to register in said slot, a bolt in said vertical passage adapted to engage such lug and means for actuating said bolt.

59. In a convertible car, the combination of a seat, means for securing the same to the car floor comprising a projecting bracket attached to the back member of said seat and a leg pivotally mounted upon said bracket, an auxiliary seat adapted to register with said first seat and means for securing such auxiliary seat thereto, such means comprising a vertical passage in the back member of said first seat, a slot intersecting the same, a lug on the back member of said auxiliary seat adapted to register in said slot, and a bolt in said vertical passage adapted to engage said lug.

60. In a convertible car, the combination of a seat, means for securing the same to the car floor comprising a projecting bracket attached to the back member of said seat and a leg pivotally mounted upon said bracket, an auxiliary seat adapted to register with said first seat and means for securing said auxiliary seat thereto, such means comprising a vertical passage in the back member of said first seat, a slot intersecting the same, a lug on the back member of said auxiliary seat adapted to register in said slot, a bolt in said vertical passage adapted to engage said lug, and means operatively connected with said leg for actuating said bolt.

61. In a convertible car, the combination of a seat having a slot on the under side of its bottom member and a spring bolt normally projecting into said slot, means for securing said seat to the car floor comprising a projecting bracket attached to the back member of said seat and a leg pivotally mounted upon said bracket and adapted to engage said slot when vertically positioned whereby said spring bolt is made to project without said bottom member, and a second seat adapted to register with said first seat and to have its bottom member engaged by such projecting bolt.

Signed by me, this 17th day of October 1905.

GEORGE J. KNOLL.

Attested by—
D. T. DAVIES,
JNO. F. OBERLIN.